United States Patent [19]

Banys

[11] 4,017,132
[45] Apr. 12, 1977

[54] MECHANIZED FILE CARRIER STABILIZATION SYSTEM

[75] Inventor: Algis Raymond Banys, Rohnert Park, Calif.

[73] Assignee: Sperry Rand Corporation, New York, N.Y.

[22] Filed: Sept. 19, 1975

[21] Appl. No.: 615,008

[52] U.S. Cl. .................................. 312/268; 312/223
[51] Int. Cl.² ................... A47B 49/00; A47B 77/16
[58] Field of Search ........... 312/134, 223, 266–268; 211/121; 198/158, 137

[56] References Cited

UNITED STATES PATENTS

| | | | |
|---|---|---|---|
| 3,532,405 | 10/1970 | Anders | 312/268 |
| 3,720,451 | 3/1973 | Anders | 312/268 |
| 3,893,741 | 7/1975 | Schick | 312/268 |

Primary Examiner—Casmir A. Nunberg
Attorney, Agent, or Firm—Eugene T. Battjer

[57] ABSTRACT

A mechanized file comprising a plurality of article storage carriers pivotally suspended from and controllably transported by a closed loop conveyor mechanism for selectively positioning the carriers at an operator work station. A first pair of diagonally disposed rollers is provided on one side of each carrier and a second pair of diagonally disposed rollers, oriented transverse to the first pair, is provided on the other side of each carrier. Tracks are arranged on each side of the file for engagement with the rollers to limit tilt of the carriers while being transported by the conveyor mechanism.

6 Claims, 4 Drawing Figures

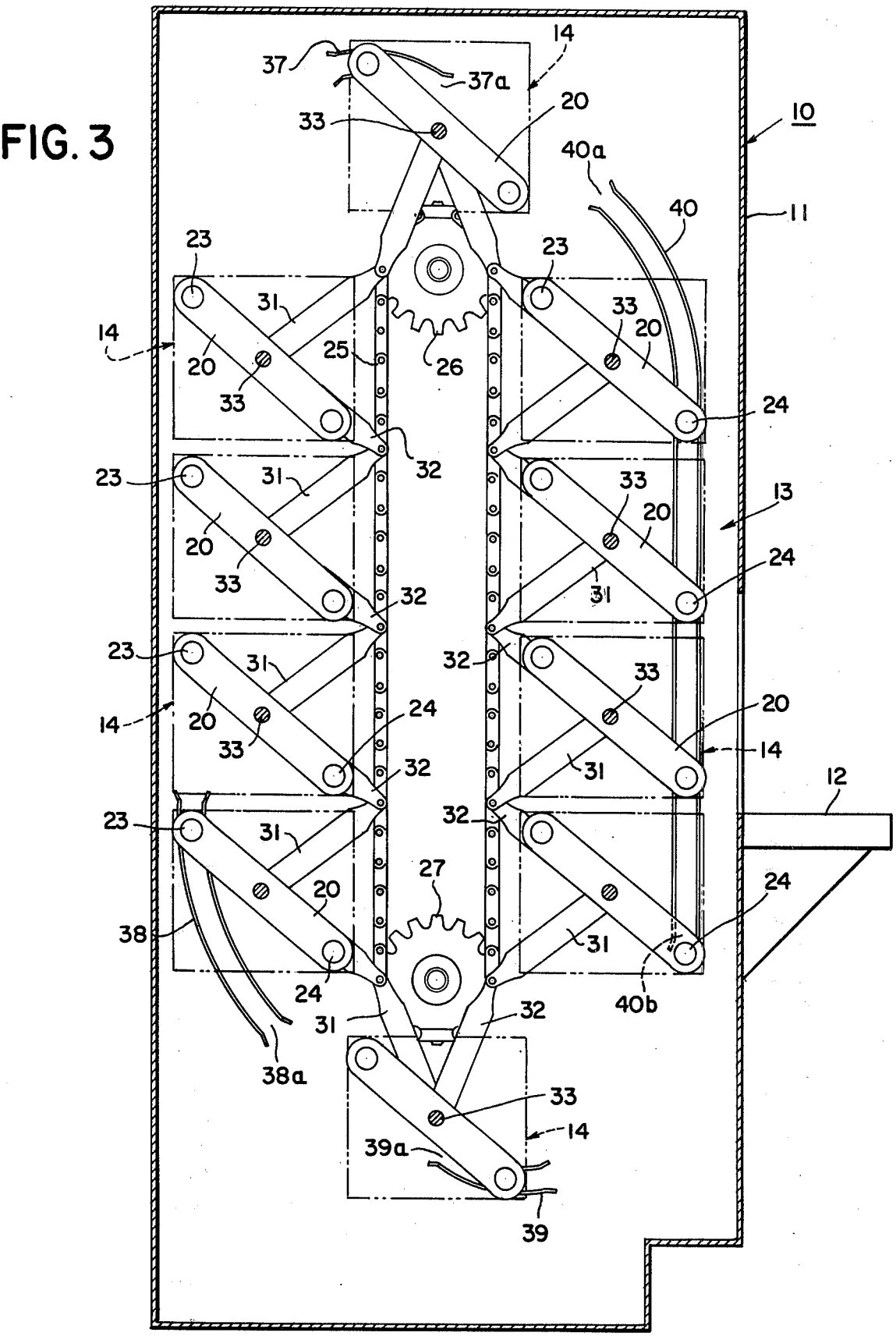

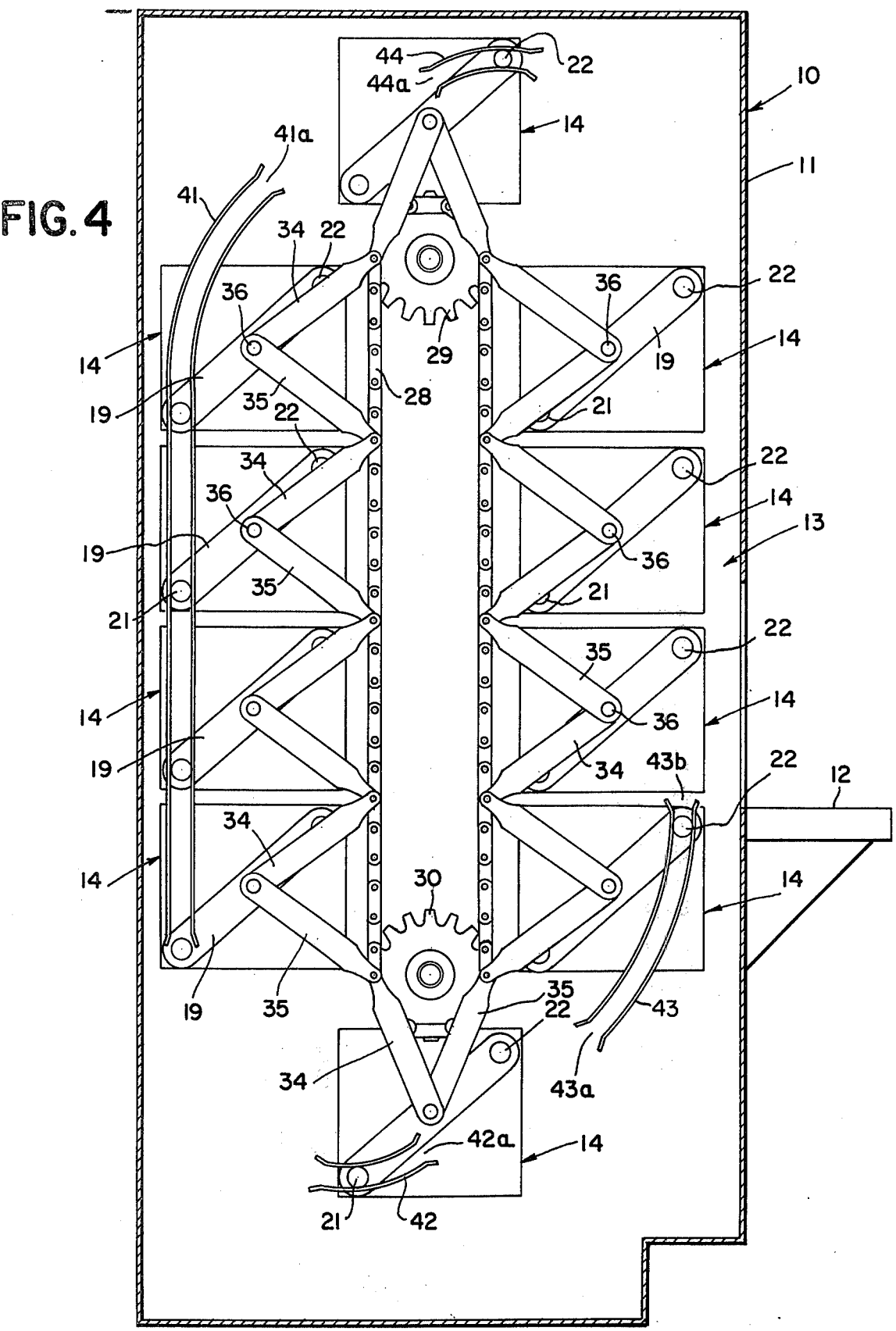

MECHANIZED FILE CARRIER STABILIZATION SYSTEM

BACKGROUND OF THE INVENTION

1. Field of the Invention

This invention relates generally to mechanized filling equipment of the type in which article storage carriers are suspended from a conveyor and controllably transported around a closed loop path for selectively positioning the carriers at a work station to permit access thereto, and more particularly relates to new and improved means for stabilizing the attitude of the carriers in the course of travel along the closed path.

2. Description of the Prior Art

Mechanized files of the type to which the present invention relates are exemplified by that shown in U.S. Pat. No. 3,236,577 issued to W. G. Anders et al and assigned to the assignee of the instant application. As illustrated in the patent, the files comprise a plurality of article storage carriers which are conveyed around a closed loop path typically formed by a pair of laterally spaced, vertically oriented chain and sprocket wheel assemblies. The carriers are pivotally suspended on each end from a respective chain by a pair of suspension arms which connect at one end to spaced points along the chain and at the other end to a rod extending laterally from the end of the carrier. A stabilizer arm is fixedly secured at one end to each lateral rod at a prescribed angle to the vertical, generally on the order of 45°. A roller is provided on the other end of each stabilizer arm to ride in an oval guide track disposed adjacent the end of the carriers. The stabilizer arms and guide tracks serve to limit tilt of the carriers about an axis through the lateral rods in the course of traveling around the closed path. The mechanism of the stabilizer arms, rollers and associated guide tracks is rather costly and thus for the purpose of reducing these costs, sections of vertical track have been eliminated in some instances and the stabilization along the vertical portions of the closed path provided by alternate means such as internesting notches and rods constructed on the ends of the respective carriers as shown in the aforementioned patent. In any event, the apparatus is still quite costly because of the need for the stabilizer arms and rollers to provide stabilization along the portion of the closed path around the sprocket wheels.

It is a principal object of the present invention to provide mechanized file carrier stabilizing apparatus which is more economical than stabilizing apparatus heretofore used in the art and which affords the further advantage of conserving lateral space whereby greater storage area may be provided without any increase in the exterior dimensions of the file.

SUMMARY OF THE INVENTION

In accordance with the principles of the present invention, a pair of guide rollers is provided on each end of the carriers. On one end of all the carriers, the rollers are located in lower front and upper rear corners of the carrier end plate. On the other end of all the carriers, the rollers are located in upper front and lower rear corners of the carrier end plate. Track sections are provided in a vertical plane adjacent each end of the carriers to guide the respective rollers over various portions of the closed loop path. The track sections are constructed and arranged relative to the rollers to assure that at least one roller on one end of each carrier is in contact with a track section at any point around the closed loop path and that two rollers are in contact with respective track sections at points along the curved portions of the path where carrier tilt is likely to be the greatest.

BRIEF DESCRIPTION OF THE DRAWINGS

FIG. 3 is a view of the right side of the file looking along the lines 3—3 of FIG. 1.

FIG. 4 is a view of the left side of the file looking along the lines 4—4 of FIG. 1.

DESCRIPTION OF THE PREFERRED EMBODIMENT

Figure 1:
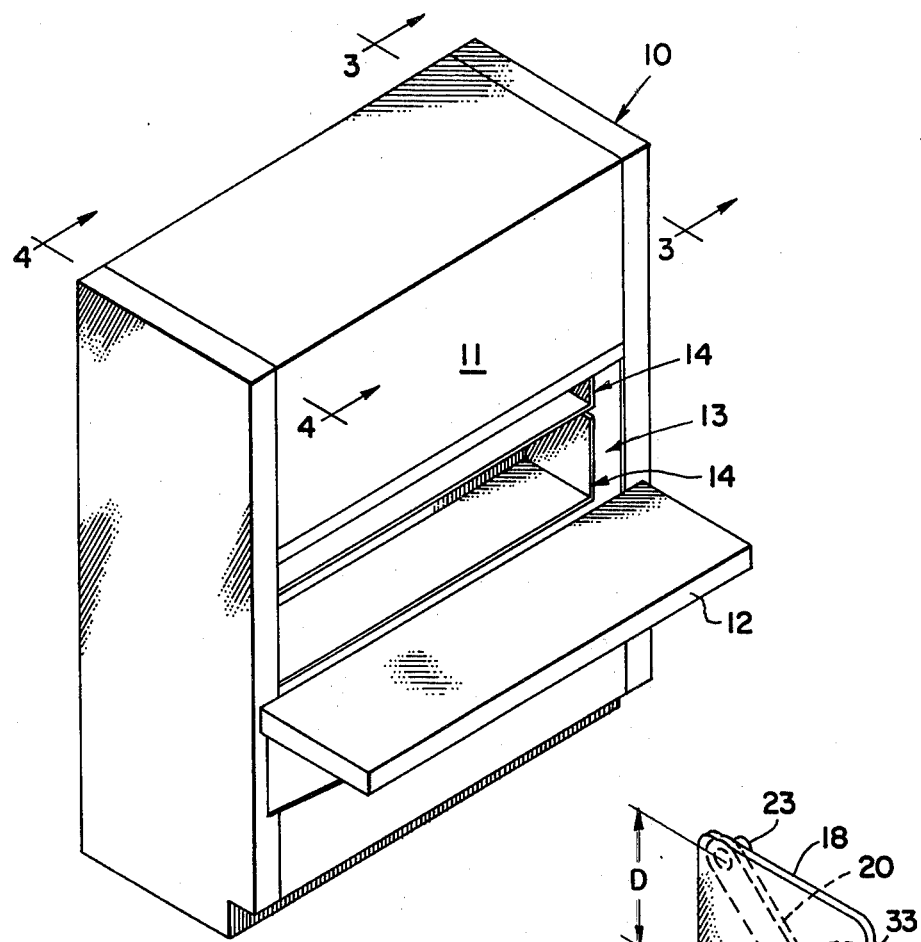
FIG. 1 is a perspective view of a mechanized file of the type to which the invention applies.
Figure 2:
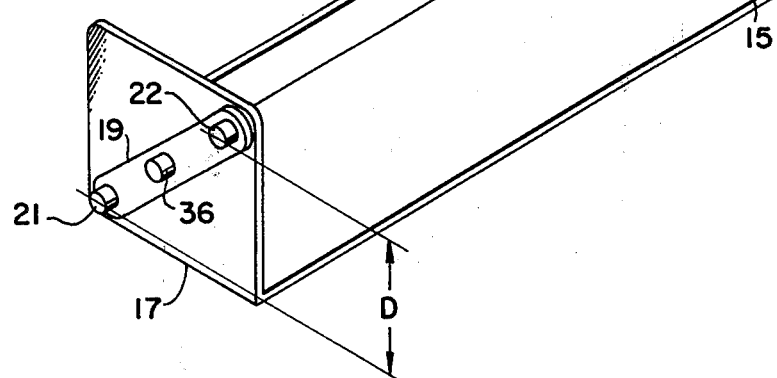
FIG. 2 is a perspective view of a typical carrier incorporated in the file of FIG. 1.

FIG. 1 depicts a mechanized file 10 comprising a cabinet 11 having a horizontal posting board 12 serving as a work station positioned below an opening 13 in the cabinet. Carriers 14 move along a closed loop path interiorly of the cabinet whereby any selected carrier may be positioned at the cabinet opening immediately above the posting board. As shown in FIG. 2, the carriers have a horizontal shelf 15 and back wall 16 supported between side plates 17, 18. Member 19 is secured to and extends diagonally from the lower rear corner to the upper front corner of side plate 17. Member 20 is secured to and extends diagonally from the upper rear corner to the lower front corner of side plate 18. Rollers 21 and 22 are mounted at opposite ends of member 19 and, likewise, rollers 23 and 24 are mounted at opposite ends of member 20 for engagement with guide tracks positioned adjacent the respective sidewalls of the file cabinet as will be further explained in the following paragraphs.

Referring now to FIGS. 3 and 4, the right side of the carriers 14, as viewed from the front of the file, are suspended from a chain 25 which rides on upper and lower sprocket wheels 26, 27 and the left side of the carriers are suspended from chain 28 riding on upper and lower sprocket wheels 29, 30. The lower sprocket wheels are typically connected to a shaft which is driven by a motor and control circuit so that any selected carrier can be moved to the cabinet opening immediately above the posting board in response to actuation of appropriate control buttons as is well known in the art. Each carrier is suspended on the right side from chain 25 by a pair of suspension arms 31, 32 pivotally connected at one end to the chain and pivotally connected at the other end to a rod 33 extending laterally from the carrier side plate 18. The carriers are similarly suspended on the left side from chain 28 by suspension arms 34, 35 connecting to rod 36.

In the course of moving in either direction along the closed loop path around the sprocket wheels, the carriers are free to rotate about an axis through the laterally extending rods as a result of the suspension arms being pivotally connected thereto. Right and left side guide track sections 37–40 and 41–44, respectively, engage the carrier mounted rollers 21–24 to control the attitude of the carriers and preclude inordinate tilting thereof due to unbalanced loading or other asymmetrically applied forces. Track sections 37–40 are supported in a vertical plane on framework (not shown) adjacent the right side wall of the file cabinet. Track sections 37, 38 are disposed along one vertically elongated oval path and track sections 39, 40 are disposed along another vertically elongated oval path laterally spaced from (that is, depthwise of the file) and slightly below the oval path of track sections 37 and 38. Track sections 41–44 are identical in construction to track sections 37–40 and are supported in a vertical plane on framework adjacent the left side wall of the file cabinet. Track sections 41, 42 are disposed along a vertically elongated oval path corresponding in size, shape and vertical elevation to the oval path of track sections 39, 40 and track sections 43, 44 are disposed along a vertically elongated oval path corresponding in size, shape and vertical elevation to the oval path of track sections 37, 38.

Stabilization of the carriers is provided as follows. Roller 23 rides in tracks 37 and 38 and roller 24 rides in tracks 39 and 40. In like manner, roller 21 rides in tracks 41 and 42 and roller 22 rides in tracks 43 and 44. Adjacent ends 37a and 40a of upper tracks 37 and 40 are positioned along one-half of the curved path about upper sprocket wheel 26 such that roller 23 is momentarily in contact with track 37 while roller 24 is in contact with track 40 for either direction of motion of the carriers about the closed loop path. In other words, for clockwise carrier motion in accordance with the view of FIG. 3, roller 24 contacts end 40a of track 40 before roller 23 leaves contact with end 37a of track 37. The end 38a of lower track 38 is similarly arranged relative to the adjacent end 39a of lower track 39 along one-half of the curved path about lower sprocket wheel 27 so that roller 23 comes into contact with track 38 while roller 24 is still in contact with track 39. It will be noted, however, that the adjacent ends of tracks 38, 39 are spaced along the half of the lower curved path which is diagonally opposite the half of the upper curved path along which the adjacent ends of tracks 37 and 40 are spaced.

In like manner, adjacent ends 41a, 44a of upper tracks 41, 44 are spaced along one half of the curved path about upper sprocket wheel 29 such that, for either direction of carrier motion about the closed loop path, roller 21 is momentarily in contact with track 41 while roller 22 is in contact with track 44. The end 42a of lower track 42 is spaced from the adjacent end 43a of lower track 43 along one-half of the curved path around lower sprocket wheel 30 so roller 21 is momentarily in contact with track 42 while roller 22 is in contact with track 43. As in the case of the right side tracks, the adjacent ends of tracks 42, 43 are located along the half of the lower curved path diagonally opposite the half of the upper curved path along which adjacent ends of tracks 41, 44 are located. Further, since the views of both FIG. 3 and FIG. 4 are obtained looking to the right in FIG. 1, it will be noted that the adjacent ends of left side tracks 41 and 44 are located along one-half of the upper curved path while the adjacent ends of right side tracks 37 and 40 are located along the other half of the upper curved path. Likewise, the adjacent ends of left side tracks 42, 43 and right side tracks 38, 39 are located along respective halves of the lower curved path.

In addition to being arranged and spaced relative to one another and with respect to the diagonally disposed rollers on each side of the carriers as explained above, the track lengths are selected so that at least one roller on one side or the other of each carrier is in contact with a track at any point along the closed loop path of carrier motion. More importantly, for the location of each carrier (more precisely, the lateral rods 33, 36 on the carriers) at an angle of approximately 45° from the vertical along the upper and lower curved paths, two rollers on one side or the other of each carrier are in contact with tracks to provide increased stabilization under conditions where carrier tilt is most likely to be the worst.

As a further feature of the invention, the lower end 40b of track 40 extends below the upper end 43b of track 43 a distance at least equal to the vertical distance D between the respective left side and right side rollers 21, 22 and 23, 24 in a level attitude of the carrier. With this construction, roller 24 is in contact with track 40 on the right side of the file and roller 22 is in contact with track 43 on the left side of the file for any carrier positioned at the cabinet opening adjacent the posting board.

While the invention has been described with reference to a specific embodiment, it will be apparent that improvements and modifications may be made within the purview of the invention without departing from the true spirit and scope thereof as defined in the appended claims.

I claim:

1. Mechanized filing apparatus of the type in which a plurality of article storage carriers are controllably conveyed along a closed loop path for selectively positioning the carriers at a work station adjacent the apparatus, comprising:

a plurality of carriers each having a lateral shelf member and a pair of side members spaced along and extending transversely of the shelf member for holding and storing articles, a conveyor assembly for conveying the carriers along the closed loop path, including first and second pairs of vertically spaced wheels laterally separated from one another, a first flexible member extending around and riding on the first pair of wheels, a second flexible member extending around and riding on the second pair of wheels, and means for pivotally suspending each carrier from the flexible members including a pair of suspension arms connected from spaced points along the first flexible member to a rod extending laterally from one side member of the carrier and another pair of suspension arms connected from spaced points along the second flexible member to a rod extending laterally from the other side member of the carrier, each carrier having a first pair of rollers mounted in diagonally disposed relation to one another on the one side member of said carrier and having a second pair of rollers mounted in diagonally disposed relation to one another on the other side member of said carrier, the diagonal disposition of said second pair of rollers being transverse to the diagonal disposition of said first pair of rollers, and track means positioned adjacent the carrier side members for guiding the rollers to limit the tilt of the carriers while moving around the closed loop path, said track means including upper first and second track sections and lower first and second track sections disposed in discontinuous nonoverlapping relation to one another in a vertically oriented plane adjacent the one side member of the carriers, adjacent ends of the upper first and second track sections being spaced along one-half of an upper curved portion of the closed loop path about the upper wheels, adjacent ends of the lower first and second track sections being spaced along one-half of a lower curved portion of the closed loop path about the lower wheels and diagonally opposite the adjacent ends of the upper first and second track sections, said upper and lower first and second track sections being arranged such that as each carrier moves along upper and lower curved portions of the closed loop path one roller of said one side member is guided by the first track sections and the diagonally disposed roller of said one side member is guided by the second track sections, said track means further including upper third and fourth track sections and lower third and fourth track sections disposed in discontinuous nonoverlapping relation to one another in a vertically oriented plane adjacent the other side member of the carriers, adjacent ends of the upper third and fourth track sections being spaced along the other half of the upper curved portion of the closed loop path along which the upper first and second track sections are spaced and adjacent ends of the lower third and fourth track sections being spaced along the other half of the lower curved portion of the closed loop path along which the lower first and second track sections are spaced, said upper and lower third and fourth track sections being arranged such that as each carrier moves along the upper and lower curved portions of the closed loop path one roller of said other side member is guided by the third track sections and the diagonally disposed roller of said other side member is guided by the fourth track sections.

2. The apparatus of claim 1 wherein said adjacent ends of the upper and lower first and second track sections are spaced a distance less than the distance between the rollers on said one side member of each carrier and said adjacent ends of the upper and lower third and fourth track sections are spaced a distance less than the distance between the rollers on said other side member of each carrier.

3. The apparatus of claim 2 wherein said upper and lower first track sections lie along a first oval path and said upper and lower second track sections lie along a second oval path displaced to the side and below but partially overlapping the first oval path, and said upper and lower third track sections lie along a third oval path and said upper and lower fourth track sections lie along a fourth oval path displaced to the side and below but partially overlapping the third oval path.

4. The apparatus of claim 3 wherein said upper second track section lying along the second oval path vertically overlaps said lower third track section lying along the third oval path a distance at least equal to the vertical distance between the diagonally disposed rollers on the side members of the carriers at the elevation of the work station.

5. The apparatus of claim 3 wherein the first and third oval paths laterally overlap one another depthwise of the filing apparatus and are similar in size, shape and vertical elevation, said upper first track section lying along the first oval path is identical to said upper third track section lying along the third oval path, and said lower first track section lying along the first oval path is identical to said lower third track section lying along the third oval path and wherein the second and fourth oval paths partially overlap one another depthwise of the filing apparatus and are similar in size, shape and vertical elevation, said upper second track section lying along the second oval path is identical to said upper fourth track section lying along the fourth oval path and said lower second track section lying along the second oval path is identical to said lower fourth track section lying along the fourth oval path.

6. The apparatus of claim 5 wherein said upper second track section lying along the second oval path vertically overlaps said lower third track section lying along the third oval path a distance at least equal to the vertical distance between the diagonally disposed rollers on the side members of the carriers in a level attitude.

* * * * *